United States Patent [19]

Tsang

[11] Patent Number: 5,438,266
[45] Date of Patent: Aug. 1, 1995

[54] INSTRUMENT TO LOCATE BURIED CONDUCTORS BY PROVIDING AN INDICATION OF PHASE REVERSAL OF THE SIGNAL UTILIZING THE ODD HARMONIC AND THE EVEN HARMONIC WHEN A VERTICAL AXIS COIL PASSES OVER ONE OF THE BURIED CONDUCTORS

[75] Inventor: Tony H. S. Tsang, Vancouver, Canada

[73] Assignee: B.C. Hydro and Power Authority, Vancouver, Canada

[21] Appl. No.: 162,258

[22] Filed: Dec. 7, 1993

[51] Int. Cl.6 .............................................. G01V 3/08
[52] U.S. Cl. ..................... 324/326; 324/67; 379/25
[58] Field of Search ............... 324/66, 67, 326, 527, 324/528, 529, 530, 543; 379/25, 26

[56] References Cited

U.S. PATENT DOCUMENTS

| | | | |
|---|---|---|---|
| 3,878,453 | 4/1975 | Potter et al. | 324/3 |
| 3,889,179 | 6/1975 | Cutler | 324/3 |
| 3,971,981 | 7/1976 | Nakagone et al. | 324/326 |
| 4,075,675 | 2/1978 | Burkett et al. | 361/48 |
| 4,085,360 | 4/1978 | Howell | 324/67 |
| 4,220,913 | 9/1980 | Howell et al. | 324/326 |
| 4,390,836 | 6/1983 | Bruce et al. | 324/326 |
| 4,639,674 | 1/1987 | Rippingale | 324/67 |
| 4,686,454 | 8/1987 | Pecukonis | 324/67 |
| 4,896,117 | 1/1990 | Flowerdew et al. | 324/326 |
| 5,055,793 | 10/1991 | Mulcahey | 324/326 |
| 5,093,622 | 3/1992 | Balkman | 324/326 |
| 5,260,659 | 11/1993 | Flowerdew et al. | 324/326 |

FOREIGN PATENT DOCUMENTS

| | | | |
|---|---|---|---|
| 0051381 | 4/1980 | Japan | 324/67 |
| 0002082 | 1/1986 | Japan | 324/509 |
| 2006438 | 5/1979 | United Kingdom . | |

Primary Examiner—Sandra L. O'Shea
Assistant Examiner—Roger C. Phillips
Attorney, Agent, or Firm—Fish & Richardson

[57] ABSTRACT

An apparatus is disclosed to locate buried conductors, specifically a substation grounding grid. The apparatus provides accurate and precise location of a conductor as it is passed across the ground surface. A power unit is provided that includes a signal generator to produce a periodic test current, asymmetric in time, that has at least one odd harmonic and one even harmonic of a fundamental frequency. The periodic test current is passed through the buried conductors. A portable search unit has a substantially vertical axis coil attuned to pick up a signal including the odd harmonic and the even harmonic of the fundamental frequency from the periodic test current, a power source is provided and a signal interpretation processor and indicator provides an indication of phase reversal of the signal utilizing the odd harmonic and the even harmonic when the vertical axis coil passes over at least one of the buried conductors.

17 Claims, 3 Drawing Sheets

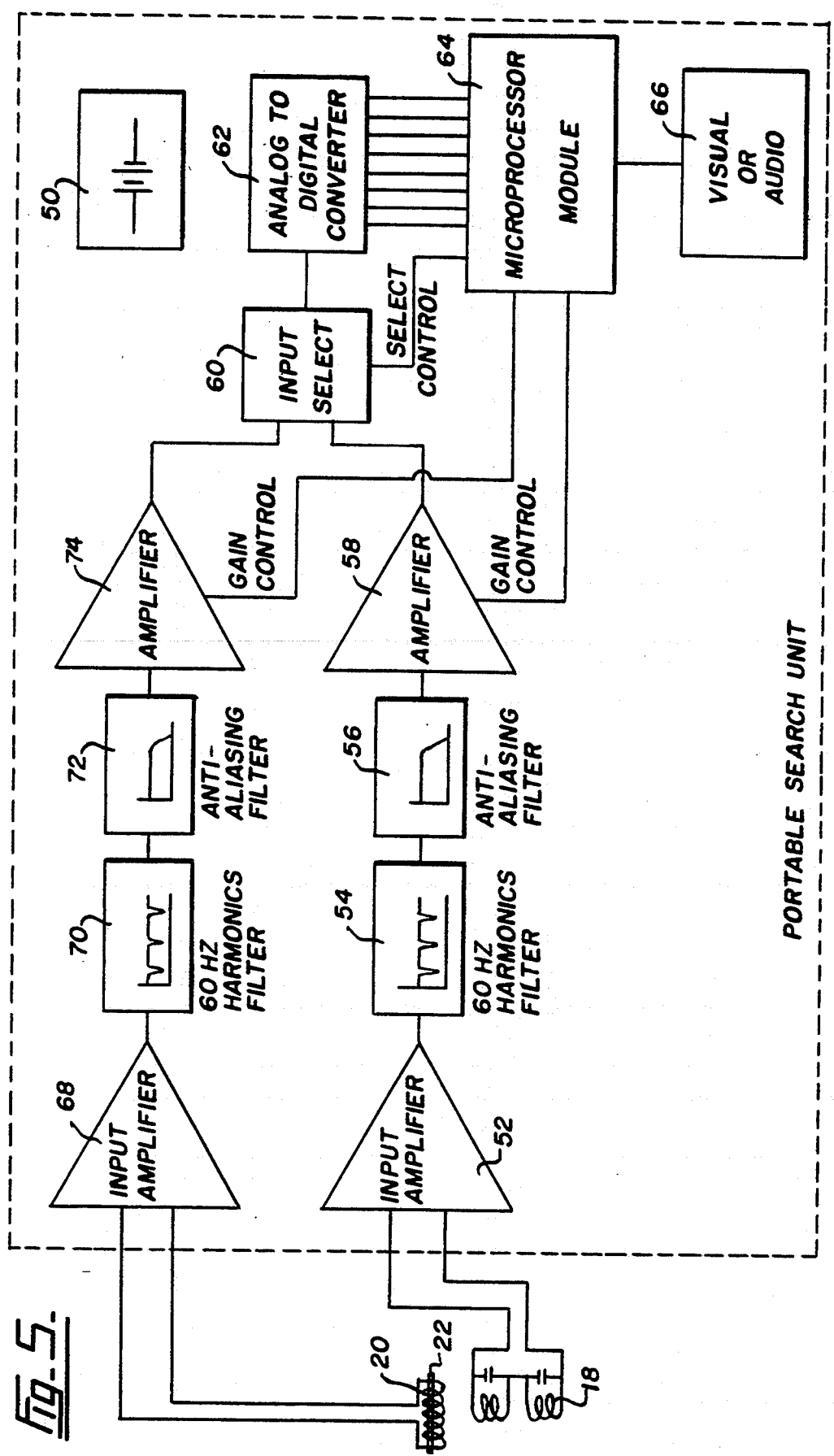

INSTRUMENT TO LOCATE BURIED CONDUCTORS BY PROVIDING AN INDICATION OF PHASE REVERSAL OF THE SIGNAL UTILIZING THE ODD HARMONIC AND THE EVEN HARMONIC WHEN A VERTICAL AXIS COIL PASSES OVER ONE OF THE BURIED CONDUCTORS

TECHNICAL FIELD

The present invention relates to an instrument used to locate buried conductors, such as an underground cable or ground grid conductors utilizing a unique search coil design and signal processing software.

BACKGROUND ART

A number of different instruments and devices are available to obtain the position of an underground cable. In some cases a coil is used to determine the magnitude of a current circulating through the cable. Such devices are not very accurate unless more than one coil is used and the position of the underground cable located by triangulation of more than one signal. One example of such a device is disclosed in Japanese patent application 55-51381. A similar instrument is disclosed in U.S. Pat. No. 5,093,622 to Balkman. A receiving array uses two vertically disposed sets of two orthogonal coils, each coil being a solenoid wound around a ferrite core.

Triangulation methods of determining the location of underground conductors generally require readings to be taken at different locations and a calculation must then be made from these readings to determine the location of the conductor. There are other types of instruments using radiated magnetic and electric fields to trace hidden conductors in open circuit and continuous circuit cases, see for example U.S. Pat. No. 4,686,454 to Pecukonis.

DISCLOSURE OF INVENTION

It is an aim of the present invention to provide a portable instrument for locating underground conductors, be they insulated or non-insulated cables or pipes, through which a test electric current is passed. One example for utilizing the instrument of the present invention is in a substation grounding grid, a system which provides a common ground for electrical devices or metallic structures in the substation. It consists of a number of horizontal, interconnected bare conductors buried in the earth. From time to time these conductors corrode or break and therefore it is necessary to conduct tests on ground grids to ensure there are no breaks in the conductors that could cause problems by not providing proper grounding for the substation.

In the past it has not always been easy to locate the buried conductors and it is not always easy to tell whether these conductors have breaks therein. In the present invention there is provided a power unit, preferably battery powered, which may be connected to two ends, generally vertical risers, of a buried conductor or two sides of a ground grid so that a test electric current may be passed through the conductor or ground grid. The power unit is designed to produce an asymmetric periodic test current, such as for example an asymmetric binary current. A portable search unit is used in conjunction with the power unit having at least one vertical axis coil used to accurately determine the position of the buried conductor by an abrupt phase shift or reversal as the instrument is passed from one side of the conductor to the other. The term "phase reversal" used throughout the specification is equivalent to the signal picked up by the vertical axis coil being multiplied by $-1$ in time.

The present invention provides an apparatus to locate buried conductors comprising: a power unit including a signal generator to produce a periodic test current, asymmetric in time, having at least one odd harmonic and one even harmonic of a fundamental frequency; connection means to connect the periodic test current to pass through the buried conductors; portable search unit including coil means having a substantially vertical axis coil attuned to pick up a signal including the odd harmonic and the even harmonic of the fundamental frequency from the periodic test current; power source for the coil means, and signal interpretation processing means and indicator means to provide an indication of phase reversal of the signal utilizing the odd harmonic and the even harmonic of the fundamental frequency when the vertical axis coil passes over at least one of the buried conductors.

In a further embodiment there is provided a method of locating a conductor buried in the ground comprising the steps of: introducing a periodic test current, asymmetric in time having at least one odd harmonic and one even harmonic of a fundamental frequency, to pass through the conductor; passing a portable search unit over the ground, the portable search unit having coil means with a substantially vertical axis coil attuned to pick up a signal including the odd harmonic and the even harmonic of the fundamental frequency from the periodic test current; the portable search unit providing an indication of phase reversal of the signal utilizing the odd harmonic and the even harmonic of the fundamental frequency when the vertical axis coil passes over the conductor buried in the ground.

BRIEF DESCRIPTION OF DRAWINGS

In drawings which illustrate embodiments of the present invention,

FIG. 5 is a block diagram showing a portable search unit according to one embodiment of the present invention.

BEST MODE FOR CARRYING OUT THE INVENTION

Figure 1:
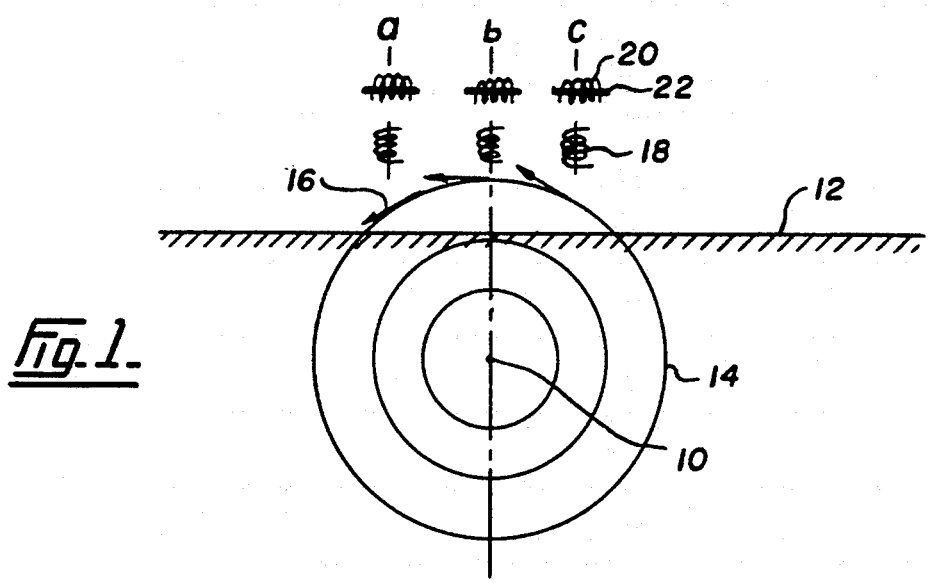
FIG. 1 is a diagram showing a buried conductor, with circular lines of constant magnetic field magnitude produced by a test current and indicating three positions of a portable search unit.

An underground cable or conductor 10 is shown in FIG. 1 below ground level 12 with circular lines 14 of constant magnetic field magnitude produced by a test current passing through the conductor 10. The magnetic field vector is indicated by arrows 16 and the vertical axis coil 18 of a portable search unit is shown in positions a, b and c.

The test current is alternating so the direction of current in the conductor and the direction of the magnetic field vector 16 alternates. As illustrated in FIG. 1, the conductor current in the conductor 10 is coming out of the page. When the vertical axis coil 18 is in the axial position b, that is to say, directly over the conductor 10, the magnetic field vector has no vertical component and hence no voltage is induced in the vertical axis coil 18. When the vertical axis coil 18 is slightly to the left of position b in position a, the magnetic field vector has a small downward vertical component as shown by arrow 16 and hence a voltage is induced in the vertical axis coil 18. When the vertical axis coil 18 is slightly to the right of position b in position c, the magnetic field vector has a small upward vertical component as shown by arrow 16 and hence a voltage is induced in the vertical axis coil 18. The difference between position a and position c is that the vertical component of the magnetic field has changed polarity, that is to say, it has changed from downward to upward and hence the induced voltage in the vertical axis coil 18 also changes polarity. It is this abrupt change or reversal in polarity of the induced voltage as the vertical axis coil 18 is moved from one side of the conductor 10 across position b to the other side, that is used to determine the position of the buried conductor 10.

The detection of the phase reversal in the induced voltage is explained mathematically as follows. The test current used, and hence the induced voltage in the vertical axis coil 18, is periodic and therefore consists of a number of Fourier Series components, each component having a frequency equal to an integral multiple of the fundamental frequency. The periodic test current is asymmetric in time containing at least one even harmonic and one odd harmonic of the fundamental frequency.

The phase in radians as a function of time of the nth Fourier Series component of the induced voltage is, $$\phi_n(t) = n\omega_o t + \phi_n(0),$$

where $\omega_o$ is the fundamental frequency of the periodic induced voltage, in radians per second, $\phi_n(0)$ is the initial phase, and t is the time, in seconds.

The phase in radians as a function of time of the mth Fourier Series component of the induced voltage is, $$\phi_m(t) = m\omega_o t + \phi_m(0).$$

From the above two phases, we derive the following function, $$\begin{aligned}\Delta_{mn}(t) &= m\phi_n(t) - n\phi_m(t) \\ &= mn\omega_o t + m\phi_n(0) - nm\omega_o t - n\phi_m(0) \\ &= m\phi_n(0) - n\phi_m(0),\end{aligned}$$

which is constant in time.

Assuming that the above constant $\Delta_{mn}(t)$ is calculated for the vertical axis coil 18 at position a in FIG. 1, then as the coil 18 is moved right, to position c, the induced voltage suffers a phase reversal, or equivalently is multiplied by −1 in time. The phase of each Fourier Series component is shifted by $\pi$ radians. Thus, we have, $$\phi_n'(t) = \phi_n(t) - \pi = n\omega_o t + \phi_n(0) - \pi, \text{ and}$$

$$\phi_m'(t) = \phi_m(t) - \pi = m\omega_o t + \phi_m(0) - \pi.$$

Now, $$\begin{aligned}\Delta_{mn}'(t) &= m\phi_n(0) - n\phi_m(0) + (n-m)\pi \\ &= \Delta_{mn}(t) + (n-m)\pi.\end{aligned}$$

Thus, in passing over the conductor, the derived function, $\Delta_{mn}(t)$, suffers an abrupt change of $(n-m)\pi$.

If n and m are both odd integers, then n−m is even and the phase shift is an even multiple of $\pi$ radians which is equivalent to no phase shift. If m is odd and n is even, the phase shift is an odd multiple of $\pi$ radians which is equivalent to a phase shift of $\pi$ radians. Since only an asymmetric waveform contains both even and odd harmonics, this type of waveform is required to provide the phase reversal indication. As the power in the harmonic frequencies falls off with increasing harmonic order, the logical choice of harmonics would be those of the lowest harmonic order, that is the fundamental or first harmonic order (m=1) and the second harmonic order (n=2).

The phases $\phi_n(t)$ and $\phi_m(t)$ are calculated by using a discrete Fourier transform (DFT). The DFT is inherently immune to interference and so this method is particularly well suited to determining the position of ground grid conductors in an energized substation where interfering currents at 60 Hz and its harmonics (2nd, 3rd, 4th, 5th and 7th in particular) are expected to be flowing in conductors for 60 cycle AC power systems. Thus, the choice of test frequencies is selected to avoid interfering currents inherent in such systems.

Before one commences sweeping with the vertical axis coil 18 to detect the phase reversal, it is preferable to provide a reference to the detection system by placing the vertical axis coil 18 to one side of a horizontal conductor carrying the test current, either above ground or buried in a known location, and executing a calibration routine.

A horizontal axis coil 20, as shown in FIG. 1, is positioned above the vertical axis coil 18 of the portable search unit. The horizontal axis coil 20 has a ferrite core 22 to provide as much sensitivity to magnetic field as possible. The horizontal axis coil 20 provides the user with a display of the relative magnitude of the magnetic field and this assists the user to determine the approximate location of the buried conductor 10 prior to its precise location with the vertical axis coil 18. Since the magnitude of magnetic field is proportional to current in the buried conductor 10, the user is aware of the relative magnitude of the test current in the conductor 10. This is important in the case of ground grid conductor detection since the test current splits over many different paths within the grid.

Furthermore, information on the direction of the buried conductor 10 can be derived by rotation of the horizontal axis coil 20 about a vertical axis. Assuming the vertical axis coil 20 is directly over a conductor 10, the pick up is maximum when the axis of the horizontal axis coil 20 is perpendicular to the conductor 10 and minimum when the axis of the horizontal axis coil 20 is parallel to the conductor 10.

Figure 2:
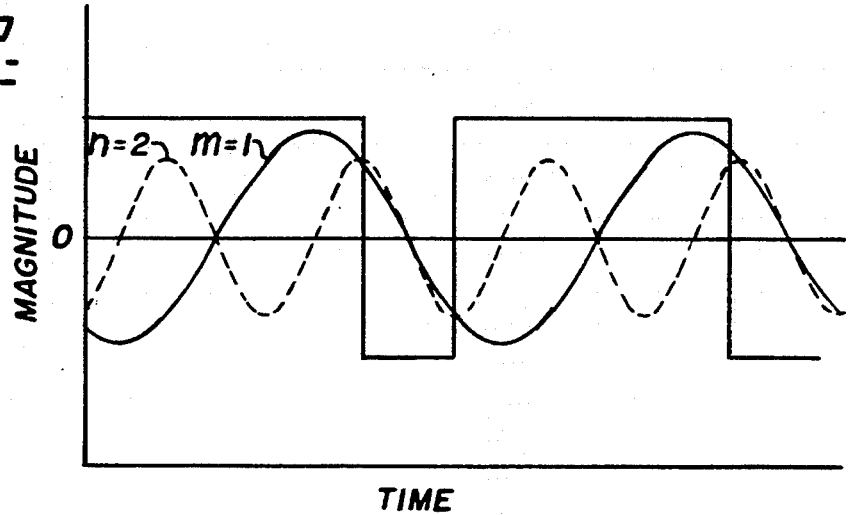
FIG. 2 is a diagram showing an asymmetric binary periodic waveform representing a signal picked up by a vertical axis coil, and that signal's first and second harmonic waveforms.
Figure 3:
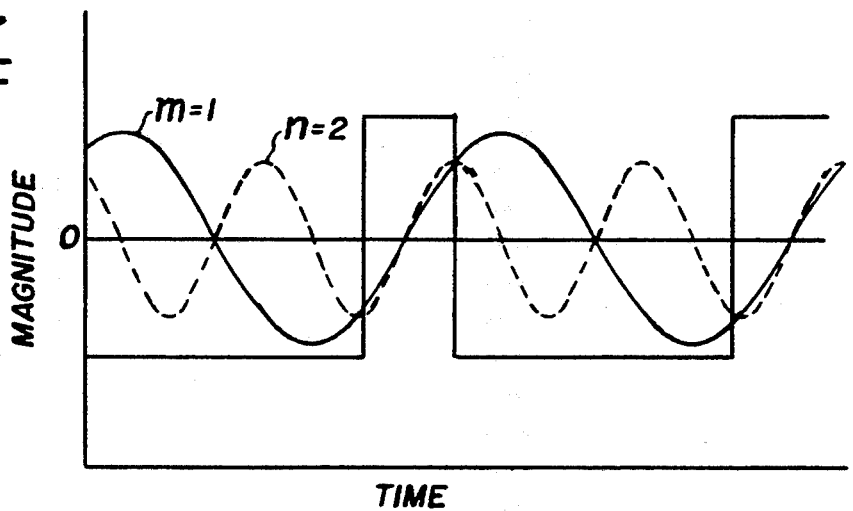
FIG. 3 is a diagram showing the three waveforms of FIG. 2 following a phase reversal; i.e. a multiplication by $-1$.

FIG. 2 shows an asymmetric binary periodic signal representing the signal picked up by the vertical axis coil 18, when the test current in the buried conductor 10 is a similar asymmetric binary periodic signal. Superimposed on the binary signal are its first (m=1) and second (n=2) harmonic waveforms. FIG. 3 shows the same three signals after the vertical axis coil 18 has passed over the conductor 10. The binary signal and its first two harmonics have been multiplied by −1. For this particular example shown, the calculated $\Delta_{mn}$ (where m =1 and n=2) for the two harmonic waveforms shown in FIG. 2 is 3.14 radians or $\pi$ radians, and the calculated $\Delta_{mn}$ for these two harmonics shown in FIG. 3 is 0 radians. Thus $\Delta_{mn}$ has changed by exactly $\pi$ radians.

Figure 4:
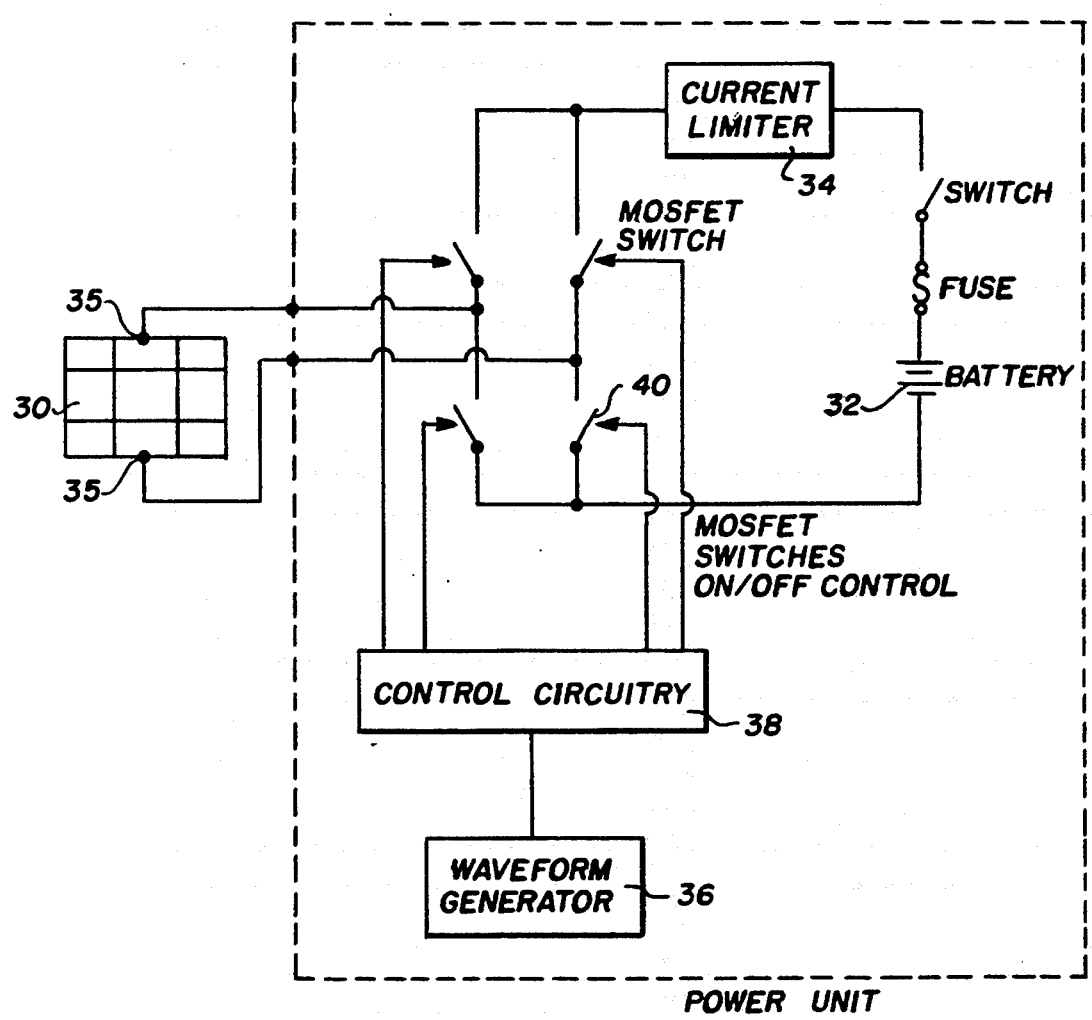
FIG. 4 is a block diagram showing a power unit according to one embodiment of the present invention.

A block diagram of the power unit is illustrated in FIG. 4 showing a ground grid 30. It will be understood that this ground grid 30 may be replaced by any type of underground conductor, be it insulated or non-insulated. It is the purpose of the power unit to produce an asymmetric test current similar to that shown in FIG. 2. A battery 32 provides the power and a current limiter 34 restricts the current flow. The current limiter 34 protects against momentary short circuits of the output leads 35 which provide connections to each side of the ground grid 30, preferably to vertical risers, or to each end or appropriate position of a buried conductor.

A waveform generator 36 generates a waveform control signal and the control circuitry 38 powers four MOSFET switches to form an H-bridge in order to form the asymmetric test current to pass through the ground grid 30.

In one embodiment, six 12 volt batteries are provided for the power unit. Only one battery is generally used at a time, however, in some instances it may be necessary to put more than one battery in series depending upon the impedance of the conductor under test. The current requirement is 1 amp with a current limiter set at 1.75 amps. In other embodiments higher currents may be used dependent upon the required strength and the type of buried conductor. Fuse protection is provided to protect the batteries 32. In a preferred embodiment for a 60 cycle power system, the frequency of the test current produced is around 500 Hz. This has been determined suitable as it is not subject to interference by any 60 Hz signals or their harmonics. Thus, the fundamental, or first harmonic of the asymmetric test current is 500 Hz and the second harmonic is 1,000 Hz.

A diagram of the portable search unit is illustrated in FIG. 5 having a vertical axis coil 18 and a horizontal axis coil 20 with a ferrite core 22 passing therethrough. As can be seen, the vertical axis coil 18 is illustrated as having two separate coaxial coils tightly coupled together. These coils may be separated, as long as they are coaxial, or may be incorporated into one coil, however, they must be tuned to pick up a signal including the two different harmonics in the asymmetric test current in the ground grid 30. Capacitors are provided across each of the coils for tuning purposes to obtain the double resonance point for the two harmonics.

The portable search unit has a battery 50 to provide power for the control signals and to provide visual or audio displays. The signal received by the vertical axis coil 18 from the test current first passes through an input amplifier 52 and then through a 60 Hz and harmonics filter 54 and an anti-aliasing filter 56. The 60 Hz and harmonics filter filters out the 60 Hz, 120 Hz, 180 Hz, 240 Hz and 300 Hz harmonics of the 60 Hz currents that may be present particularly in a ground grid for a substation. The anti-aliasing filter 56 provides a low pass filter that filters out noise and signal components above 1,000 Hz. This type of filter is necessary before an analog to digital converter to prevent aliasing error. The vertical axis coil 18 signal after being filtered passes through a second amplifier 58 and an input selector 60 to an analog to digital converter 62. A microprocessor module 64 provides a signal for a visual or audio display unit 66 to provide an indication of a phase reversal in the signal which in the case of a visual display may simply be two LEDs, one of which is on for a positive signal and the other for a negative signal. When the signal reverses between positive and negative, one light goes off and the other goes on. Alternatively, an audio display may be a two tone sound signal which switches from one tone to the other when the signal reverses. Thus, when the vertical axis coil 18 passes over a buried conductor, there is a phase reversal in the signal from the vertical axis coil 18, and this is instantly displayed on the visual display unit 66 or heard on an audio system.

The horizontal axis coil 20 provides a signal through a separate input amplifier 68, 60 Hz and harmonics filter 70, and anti-aliasing filter 72, then through an amplifier 74 to the input selector 60. A multiplexer permits monitoring signals from both the vertical axis coil 18 and the horizontal axis coil 20 concurrently. This multiplexed signal is passed to the analog to digital converter 62 and the microprocessor module 64 provides a signal to the visual or audio display 66 which in the case of the vertical axis coil 18 indicates phase reversal, and in the case of the horizontal axis coil 20 is indicative of the distance between the horizontal coil 20 and the buried conductor to provide information as to the alignment of the buried conductor and approximate location of the buried conductor. In operation, the horizontal axis coil 20 is used to provide an approximate location and alignment of a buried conductor and the accurate location is achieved by the vertical axis coil 18.

Whereas the power unit and portable search unit described herein are used for a ground grid search, it will be apparent that the system may be used for exact location of any type of buried conductor provided an asymmetric periodic test current can be passed through it. The conductor may be insulated or not. It may be a pipe or an electrical cable but, in either case, the leads 35 of the power unit must be connected to the ends or to suitable positions, and the conductor can be located between the ends or the two positions. In the case of determining the exact location of, for example, a water pipe or the like, when there are no inherent currents in the conductor, then the choice of frequencies for the test current is simplified. In the case of using a ground grid locator in a country where 60 cycle AC power system is not the normal frequency, then the frequency of the test current is chosen so that it does not interact with the inherent currents from the power supply system.

As stated, the vertical axis coil 18 may be a single coil or two coils. If two coils are provided then they should be coaxial and must be close enough together to pick up a test current representing a varied conductor. They also must be attuned to the first and second harmonics of the periodic test current and be able to determine the phase reversal. The visual or audio display may produce a bar chart or a binary display for a magnitude display from the horizontal axis coil 22. Alternatively, the signal may be a variable pitch audio tone.

Various changes may be made to the embodiments disclosed herein without departing from the scope of the present invention which is limited only by the following claims.

The embodiments of the present invention in which an exclusive property or privilege is claimed are defined as follows:

1. Apparatus to locate buried conductors comprising:
    a power unit including a signal generator to produce a periodic test current, asymmetric in time, having at least one odd harmonic and one even harmonic of a fundamental frequency;
    connection means to connect the periodic test current to pass through the buried conductors;
    portable search unit including coil means having a substantially vertical axis coil attuned to pick up a signal including the odd harmonic and the even harmonic of the fundamental frequency from the periodic test current;
    power source for the coil means, and
    indicator means to provide an indication of phase reversal of the signal when the vertical axis coil passes over at least one of the buried conductors, the indicator means being operable to:
    determine phases of the odd harmonic and the even harmonic in the signal,
    calculate a function of the two phases, the function having a value that abruptly changes when a phase reversal occurs,
    monitor the value of the function, and
    indicate a phase reversal of the signal when the value of the function abruptly changes.

2. The apparatus to locate buried conductors according to claim 1 wherein the coil means comprises two coaxial vertical axis coils, one of the coils attuned to pick up the odd harmonic of the fundamental frequency from the periodic test current, and the other of the coils attuned to pick up the even harmonic of the fundamental frequency from the periodic test current.

3. The apparatus to locate buried conductors according to claim 2 wherein the periodic test current has a fundamental and a second harmonic.

4. The apparatus to locate buried conductors according to claim 3 wherein the fundamental is at 500 Hz and the second harmonic is at 1,000 Hz.

5. The apparatus to locate buried conductors according to claim 1 including harmonic filter means in the portable search unit to filter out frequencies from electric currents inherent in the buried conductors apart from the periodic test current.

6. The apparatus to locate buried conductors according to claim 1 including a horizontal axis coil positioned in substantially the same vertical plane as the vertical axis coil in the portable search unit to produce a magnitude signal indicative of distance between the horizontal axis coil and the buried conductors, the magnitude signal fed to the signal interpretation processing means and the indicator means to provide a magnitude value.

7. The apparatus to locate buried conductors according to claim 1 wherein the indicator means is selected from the group consisting of visual indicating means and audible indicating means.

8. The apparatus to locate buried conductors according to claim 2 wherein the two coaxial vertical axis coils are tightly coupled, each of the coils being resonant for separate harmonics representing the odd harmonic and the even harmonic of the fundamental frequency from the periodic test current.

9. A method of locating a conductor buried in the ground comprising the steps of:
    introducing a periodic test current, asymmetric in time, having at least one odd harmonic and one even harmonic of a fundamental frequency, to pass through the conductor;
    passing a portable search unit over the ground, the portable search unit having coil means with a substantially vertical axis coil attuned to pick up a signal including the odd harmonic and the even harmonic of the fundamental frequency from the periodic test current;
    the portable search unit providing an indication of phase reversal of the signal when the vertical axis coil passes over the conductor buried in the ground by:
    determining phases of the odd harmonic and the even harmonic in the signal,
    calculating a function of the two phases, the function having a value that abruptly changes when a phase reversal occurs,
    monitoring the value of the function, and
    indicating a phase reversal of the signal when the value of the function abruptly changes.

10. The method of locating a conductor according to claim 9 wherein the periodic test current has a fundamental and a second harmonic.

11. The method of locating a conductor according to claim 10 wherein the portable unit includes harmonic filter means to filter out frequencies from electric currents inherent in the conductor apart from the periodic test current.

12. The method of locating a conductor according to claim 10 wherein the fundamental is at 500 Hz and the second harmonic is at 1,000 Hz.

13. The method of locating a conductor according to claim 12 wherein the magnitude of the periodic test signal is approximately 1 amp.

14. The method of locating a conductor according to claim 9 wherein the portable search unit includes a horizontal axis coil to produce a magnitude signal indicative of distance between the horizontal axis coil and the conductor.

15. The method of locating a conductor according to claim 9 wherein the indication of phase reversal is an audible signal.

16. The method of locating a conductor according to claim 9 wherein the indication of phase reversal is a visual display.

17. The method of locating a conductor according to claim 9 wherein the conductor buried in the ground is a ground grid and including harmonic filter means in the portable search unit to filter out frequencies from electric currents inherent in the ground grid apart from the periodic test signal.

* * * * *